United States Patent
Sakata et al.

(10) Patent No.: US 6,636,417 B2
(45) Date of Patent: Oct. 21, 2003

(54) ELECTRIC DOUBLE LAYER CAPACITOR AND BATTERY

(75) Inventors: Koji Sakata, Tokyo (JP); Kazuya Mimura, Tokyo (JP); Yutaka Nakazawa, Tokyo (JP); Satoshi Abe, Shimoniikawa-gun (JP)

(73) Assignee: NEC Tokin Corporation, Miyagi (JP)

( * ) Notice: Subject to any disclaimer, the term of this patent is extended or adjusted under 35 U.S.C. 154(b) by 70 days.

(21) Appl. No.: 09/862,698

(22) Filed: May 23, 2001

(65) Prior Publication Data

US 2002/0006546 A1 Jan. 17, 2002

(30) Foreign Application Priority Data

Jun. 9, 2000 (JP) ...................... P2000-174266

(51) Int. Cl.⁷ ................................. H01G 9/00
(52) U.S. Cl. ...................... 361/502; 361/517
(58) Field of Search ................ 361/502, 511, 361/513, 504, 517, 512; 29/25.03

(56) References Cited

U.S. PATENT DOCUMENTS 4,327,400 A * 4/1982 Muranaka et al. ......... 361/502

FOREIGN PATENT DOCUMENTS

| JP | 3-036501 | 2/2000 |
| JP | 2000-133220 | 5/2000 |
| JP | 2000-269100 | 9/2000 |

* cited by examiner

Primary Examiner—Anthony Dinkins
(74) Attorney, Agent, or Firm—Sughrue Mion, PLLC

(57) ABSTRACT

An electric double layer capacitor, including at least one basic cell, an electrode plate, and an outer package which covers the basic cell and the electrode plate in a decompression state. The basic cell may be laminated in its thickness direction to form a layered cell and includes a separator, a pair of polarized electrodes disposed so as to sandwich the separator, a pair of collectors disposed so as to sandwich the polarized electrodes, and a gasket disposed between the pair of collectors so as to surround the pair of polarized electrodes. The electrode plate body is attached to each of the collectors located at the outermost side in a laminated direction of the layered cell. A sealing material having a higher gas barrier property than the collectors is disposed so as to seal an interface between the collectors and the electrode plate in the outer package.

8 Claims, 4 Drawing Sheets

ELECTRIC DOUBLE LAYER CAPACITOR AND BATTERY

BACKGROUND OF THE INVENTION

1. Field of the Invention

The present invention relates to an electric double layer capacitor and a battery. More specifically, the present invention relates to an electric double layer capacitor and a battery in which a cell is covered by an outer package in a decompression state.

2. Description of Related Art

Electric double layer capacitors have been conventionally used in practice and the structural characteristics thereof have recently been utilized to further decrease their sizes and increase their capacities. For instance, considerations have been made for new uses of electric double layer capacitors, such as a driving power source for a cell motor of a vehicle in combination with a lead battery or an auxiliary power source in combination with a solar battery.

Figure 7:
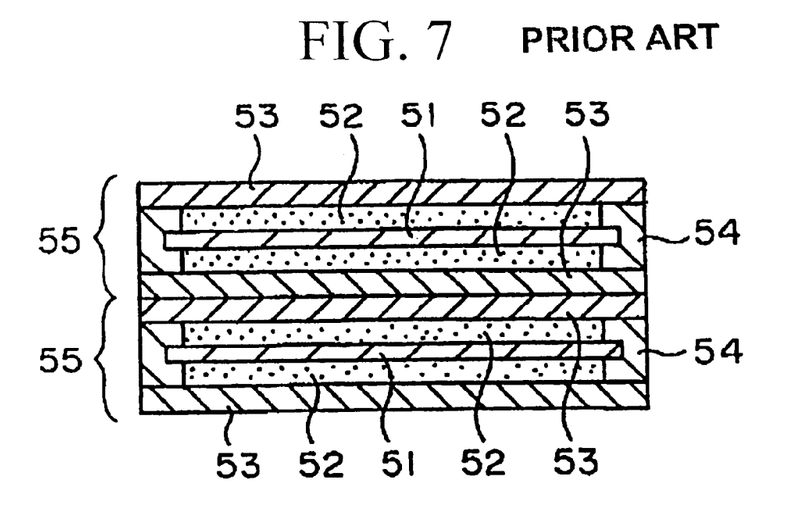
FIG. 7 is a diagram showing a side cross-sectional view of a basic cell included in a conventional electric double layer capacitor.
Figure 8:
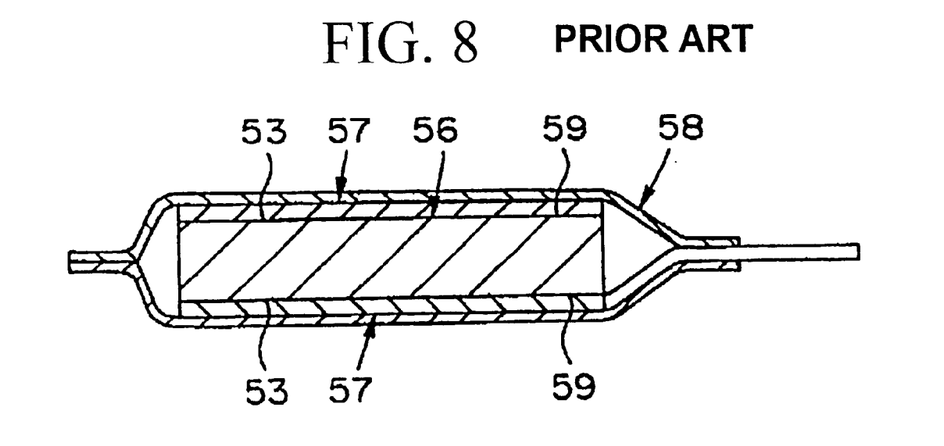
FIG. 8 is a diagram showing a side cross-sectional view of the conventional electric double layer capacitor.

Examples of the structure of electric double layer capacitors include the one shown in FIGS. 7 and 8.

The electric double layer capacitor shown in FIG. 7 includes a basic cell 55 which is constituted by a separator 51 of porous sheet type, a pair of polarized electrodes 52 and 52 of plate shape, a pair of collectors 53 and 53 of sheet shape, and gaskets 54 of frame shape. The pair of polarized electrodes 52 is disposed so as to sandwich and make contact with the separator 51 from both sides. The pair of collectors 53 is disposed so as to sandwich the polarized electrodes 52. That is, each of the pair of collectors 53 makes contact with the surface of the polarized electrodes 52 which is opposite the surface making contact with the separator 51. The gaskets 54 are disposed between the pair of collectors 53 so as to make contact with end surfaces of the polarized electrodes 52. The basic cell 55 contains an electrolyte sealed inside thereof.

In the electric double layer capacitor, a plurality of the above-mentioned basic cells 55 is laminated to form a multi-layered cell 56 shown in FIG. 8. In FIG. 8, an electrode plate 57 to which a lead terminal is connected is closely attached to the collectors 53 located at the outermost side in the laminated direction of the multi-layered cell 56, and the whole is covered by an outer package 58 in a decompression state (i.e., vacuum packed).

Since the electric double layer capacitor is covered by the outer package 58 in a decompression state, a compressive force is always applied to the capacitor from the outside due to atmospheric pressure. As a result, the degree of contact between the basic cells 55 and 55, and between the basic cell 55 and the electrode plate 57 having the lead terminal is enhanced to decrease the equivalent series resistance (ESR). Accordingly, the performance of the capacitor may be further improved and stabilized.

The need for an electric double layer capacitor having an improved performance has recently been increasing and a further reduction of the ESR thereof is awaited. It has been discovered that if, for instance, a conductive film in which carbon is dispersed in an olefin resin is used for the collector 53 instead of a conventional conductive rubber in which carbon is dispersed in butyl rubber, the ESR of the collector 53 may be further reduced.

However, some of the above-mentioned conductive films have gas permeability coefficients higher than those of conventional ones, and electrolytes contained in the basic cells 55 may be gasified and leaked out from an interface 59 between the collectors 53 and the electrode plate 57 of the basic cells 55 which are located at the outermost side of the multi-layered cell 56 in some cases. If a gas were to leak out from the basic cell 55, the decompression state in the outer package 58 would no longer be maintained and the degree of contact between the basic cells 55 and 55, and between the basic cell 55 and the electrode plate 57 having a lead terminal would decrease. If the degree of contact were to decrease, the ESR thereof increases and the performance as a capacitor deteriorates and becomes unstable. This kind of problem is especially conspicuous under a high temperature atmosphere.

The present invention takes into consideration the above-mentioned circumstances, with an object of providing an electric double layer capacitor and a battery, which uses a material having high gas permeability constant for a collector in order to decrease the ESR, yet capable of preventing the increase of ESR due to a gas leak and, hence, electric performance thereof may be stabilized even under a high temperature atmosphere.

SUMMARY OF THE INVENTION

The present invention provides an electric double layer capacitor, including: at least one basic cell containing an electrolyte inside thereof, the basic cell may be laminated in its thickness direction to form a layered cell, including: a separator; a pair of polarized electrodes disposed so as to sandwich and make contact with the separator; a pair of collectors disposed so as to sandwich the polarized electrodes, each one of the pair of collectors making contact with the surface of one of the pair of polarized electrodes which opposes the surface making contact with the separator; and a gasket disposed between the pair of collectors so as to surround the pair of polarized electrodes; an electrode plate including an electrode body and a lead terminal extending from the electrode plate body, the electrode plate body being attached to the outer surface of each one of the collectors located at the outermost side in a laminated direction of the basic cell; an outer package which covers the basic cell and the electrode plate in a decompression state; and a sealing material having a higher gas barrier property than the collectors, the sealing material being disposed so as to seal an interface between each one of the collectors, which are located at the outermost side in a laminated direction of the basic cell, and the electrode plate body in the outer package.

According to the above electric double layer capacitor, since the sealing material having a higher gas barrier property than the collectors is disposed so as to seal an interface between each one of the collectors, which are located at the outermost side in a laminated direction of the basic cell, and the electrode plate body in the outer package, it becomes possible to prevent the electrolyte from being gasified and leaking out from the interface between the collector and the electrode plate body.

Accordingly, even if the collector were formed by using a material having a high gas permeability constant in order to lower the ESR thereof, the decompression state inside the outer package might be suitably maintained. Thus, it becomes possible to prevent an increase in the ESR due to a gas leak, and the electrical properties of the capacitor may be stabilized even if the capacitor were to be used under a high temperature atmosphere.

In accordance with another aspect of the invention, the gas permeability coefficient of each one of the collectors is at least $1\times10^{-12}[m^3/(m^2 \cdot s \cdot Pa)]$.

According to the above electric double layer capacitor, since the gas permeability coefficient of a collector becomes $1 \times 10^{-12} [m^3/(m^2 \cdot s \cdot Pa)]$ or greater, the amount of electrolyte which is gasified and leaked out from an interface between the collector and the electrode plate body to the inside of the outer package becomes too large to be ignored, the effect of preventing a gas leak due to the presence of the above-mentioned sealing material becomes significant.

In yet another aspect of the present invention, the electrode plate body extends in a circumferential direction thereof, and the sealing material is disposed between the extended portion of each one of the electrode bodies so as to surround the basic cell.

According to the above electric double layer capacitor, since the electrode plate body extends in a circumferential direction thereof and the sealing material is disposed between the extended portion of each one of the electrode bodies so as to surround the basic cell, the sealing material is not present between the basic cell and the electrode plate. Accordingly, it becomes possible to prevent a decrease in the degree of contact between the basic cell and the electrode plate due to the presence of the sealing material therebetween.

In yet another aspect of the present invention, the sealing material is disposed between an outer periphery portion of each one of the collectors, which are located at the outermost side in a laminated direction of the basic cell, and the electrode plate body.

According to the above electric double layer capacitor, since the sealing material is disposed between an outer periphery portion of each one of the collectors and the electrode plate body, the shape of the electrode plate body may be designed to be the same as that of the collector and, hence, the size and weight of the electric double layer capacitor may be reduced.

In yet another aspect of the present invention, the electrode plate body is disposed on each one of the collectors, which are located at the outermost side in a laminated direction of the basic cell, so as to be located more inwardly with respect to the outer periphery portion of each one of the collectors, and the sealing material is disposed so as to surround the electrode plate body and cover portions of each one of the collectors not covered by the electrode plate body.

According to the above electric double layer capacitor, since the electrode plate body is disposed on each one of the collectors so as to be located more inwardly with respect to the outer periphery portion of each one of the collectors, and the sealing material is disposed so as to surround the electrode plate body and cover portions of each of the collectors not covered by the electrode plate body, the sealing material is not present between the basic cell and the electrode plate body. Thus, it becomes possible to prevent a decrease in the degree of contact between the basic cell and the electrode plate due to the presence of the sealing material.

The present invention also provides a battery, including: at least one basic cell containing an electrolyte inside thereof, the basic cell may be laminated in its thickness direction to form a layered cell, including: a separator; a pair of polarized electrodes disposed so as to sandwich and make contact with the separator; a pair of collectors disposed so as to sandwich the polarized electrodes, each one of the pair of collectors making contact with the surface of one of the pair of polarized electrodes which opposes the surface making contact with the separator; and a gasket disposed between the pair of collectors so as to surround the pair of polarized electrodes; an electrode plate including an electrode body and a lead terminal extending from the electrode plate body, the electrode plate body being attached to the outer surface of each one of the collectors located at the outermost side in a laminated direction of the basic cell; an outer package which covers the basic cell and the electrode plate in a decompression state; and a sealing material having a higher gas barrier property than the collectors, the sealing material being disposed so as to seal an interface between each one of the collectors, which are located at the outermost side in a laminated direction of the basic cell, and the electrode plate body in the outer package.

According to the above battery, since the sealing material having a higher gas barrier property than the collectors is disposed so as to seal an interface between each one of the collectors, which are located at the outermost side in a laminated direction of the basic cell, and the electrode plate body in the outer package, it becomes possible to prevent the electrolyte from being gasified and leaked out from the interface between the collector and the electrode plate body.

Accordingly, even if the collector is formed by using a material having a high gas permeability constant in order to lower the ESR thereof, the decompression state inside the outer package may be suitably maintained. Thus, it becomes possible to prevent an increase in the ESR due to a gas leak, and the electrical properties of the capacitor may be stabilized even if the capacitor is used under a high temperature atmosphere.

In accordance with another aspect of the invention, the battery has the gas permeability coefficient of each one of the collectors being at least $1 \times 10^{-12} [m^3/(m^2 \cdot s \cdot Pa)]$.

According to the above battery, since the gas permeability coefficient of a collector becomes $1 \times 10^{-12} [m^3/(m^2 \cdot s \cdot Pa)]$ or greater, the amount of electrolyte which is gasified and leaked out from an interface between the collector and the electrode plate body to the inside of the outer package becomes too large to be ignored, the effect of preventing a gas leak due to the presence of the above-mentioned sealing material becomes significant.

In yet another aspect of the present invention, the battery has the electrode plate body extends in a circumferential direction thereof, and the sealing material is disposed between the extended portion of each one of the electrode bodies so as to surround the basic cell.

According to the above battery, since the electrode plate body extends in a circumferential direction thereof and the sealing material is disposed between the extended portion of each one of the electrode bodies so as to surround the basic cell, the sealing material is not present between the basic cell and the electrode plate. Accordingly, it becomes possible to prevent a decrease in the degree of contact between the basic cell and the electrode plate due to the presence of the sealing material therebetween.

In yet another aspect of the present invention, the battery has the sealing material disposed between an outer periphery portion of each one of the collectors, which are located at the outermost side in a laminated direction of the basic cell, and the electrode plate body.

According to the above battery, since the sealing material is disposed between an outer periphery portion of each one of the collectors and the electrode plate body, the shape of the electrode plate body may be designed to be the same as that of the collector and, hence, the size and weight of the electric double layer capacitor may be reduced.

In yet another aspect of the present invention, the battery has the electrode plate body disposed on each one of the collectors, which are located at the outermost side in a laminated direction of the basic cell, so as to be located more inwardly with respect to the outer periphery portion of each one of the collectors, and the sealing material is disposed so as to surround the electrode plate body and cover portions of each one of the collectors not covered by the electrode plate body.

According to the above battery, since the electrode plate body is disposed on each one of the collectors so as to be located more inwardly with respect to the outer periphery portion of each one of the collectors, and the sealing material is disposed so as to surround the electrode plate body and cover portions of each of the collectors not covered by the electrode plate body, the sealing material is not present between the basic cell and the electrode plate body. Thus, it becomes possible to prevent a decrease in the degree of contact between the basic cell and the electrode plate due to the presence of the sealing material.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying diagrams. This detailed description of a particular preferred embodiment, set out below to enable one to build and use one particular implementation of the invention, is not intended to limit the enumerated claims, but to serve as a particular example thereof.

Embodiment 1

First, embodiment 1 according to the present invention will be described with reference to FIGS. 1 through 3.

Figure 1:
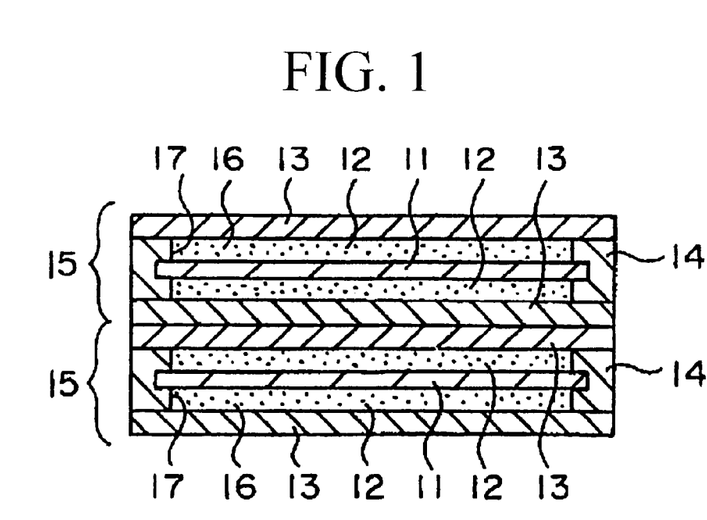
FIG. 1 is a diagram showing a side cross-sectional view of a basic cell included in an electric double layer capacitor according to embodiment 1 of the present invention.

An electric double layer capacitor according to embodiment 1 of the present invention includes, as shown in FIG. 1, a basic cell 15 which is constituted by a separator 11 of sheet type, a pair of polarized electrodes 12 and 12 of plate shape, a pair of collectors 13 and 13 of sheet shape, and gaskets 54 of frame shape. The pair of polarized electrodes 12 is disposed at both sides of the separator 11 so as to sandwich and make contact with the separator 11 in a parallel state. The pair of collectors 13 is disposed so as to sandwich and make contact with the polarized electrodes 12 in a parallel state. That is, each of the pair of collectors 13 makes contact with the surface of the polarized electrodes 12 which opposes the surface making contact with the separator 11. The gaskets 14 are disposed between the pair of collectors 13 so as to make contact with end surfaces of the polarized electrodes 12. The basic cell 15 contains an electrolyte sealed inside thereof. Note that in FIG. 1, although the basic cell 15 is depicted as one having a certain thickness (i.e., the vertical length in the figure) for the convenience of explanation, the thickness of the basic cell 15 is significantly thin in practice.

Next, the above-mentioned basic cell 15 will be described in more detail.

The separator 11 has a rectangular sheet shape and may be made of a non-conductive porous film having an ionic permeability. In this embodiment, a polypropylene resin is used for the separator 11 as its base material and the separator 11 has a thickness of about 30 $\mu$m.

The polarized electrode 12 has a rectangular plate shape and may be produced by mixing activated carbon with a binder material at a predetermined ratio in a solvent. Neither the method for producing the polarized electrode 12 nor the material used for the binder material is particularly limited as long as the polarized electrode 12 is made of activated carbon. A pair of the polarized electrodes 12, each of which has substantially the same shape, is placed so as to sandwich the separator 11 from both sides in the thickness direction of the separator 11 so that the thickness direction of the polarized electrode 12 is concurrent with that of the separator 11. The polarized electrode 12 used in this embodiment has the size of about 3 cm×3 cm with a thickness of about 50 $\mu$m.

The collector 13 has a rectangular sheet shape and may be made of a conductive film in which carbon is dispersed in an olefin resin. In this embodiment, an ethylene-styrene-butylene cross-linked copolymer resin in which carbon is dispersed to have conductivity is used as the conductive film.

A pair of the collectors 13, each of which has substantially the same shape, is placed so as to sandwich the polarized electrodes 12 and the thickness direction of the polarized electrodes 12 is made to be concurrent with that of the collectors 13. Each of the pair of the polarized electrodes 12 is printed and closely formed on the collector 13. That is, the mixture of activated carbon and a binder in a solvent at a predetermined ratio, which is a constituent of the polarized electrode 12, is printed on a surface of the collector 13 in a rectangular shape.

The gasket 14 has a rectangular frame shape and is made of an insulation material. The same base resin used for a conductive film, which forms the collector 13, may also be used for the gasket 14 and an olefin resin is employed in this embodiment. The gasket 14 is disposed so as to surround the separator 11 and the pair of polarized electrodes 12 in a direction perpendicular to the alignment direction thereof. In this state, an inner chamber 17, in which the separator 11 and the polarized electrodes 12 are contained and an electrolyte 16 is filled, are sealed by attaching the gasket 14 to the collectors 13.

An example of the electrolyte 16 which may be used in the embodiment of the present invention includes a sulfuric acid aqueous solution.

The basic cell 15 used in the embodiment of the present invention may be produced by the following procedure.

As a first step, activated carbon and a binder, which are components of the polarized electrode 12, are mixed in a solvent at a predetermined ratio.

Then, as a second step, the components of the polarized electrode 12, which were been mixed in the first step, are printed onto a predetermined position of the collector 13, which is made of a conductive film, in a predetermined shape to form the polarized electrode 12.

As a third step, the electrolyte 16 is injected into the polarized electrode 12 and the separator 11.

As a fourth step, while the separator 11 is disposed between the pair of the collectors 13, on which the polarized electrode 12 has been formed, in a state that the polarized electrode 12 faces the separator 11, and the gasket 14 is disposed between the collectors 13 so as to surround the end portion of the polarized electrodes 12, the interface of the collectors 13 and the gasket 14 is heated at a predetermined temperature (e.g., 120° C.) for a predetermined time (e.g., 10 sec.) while applying a predetermined pressure (e.g., 0.003 Pa) so that they become attached to each other by thermal fusion.

The basic cell 15 is produced in the above-mentioned manner.

Figure 2:
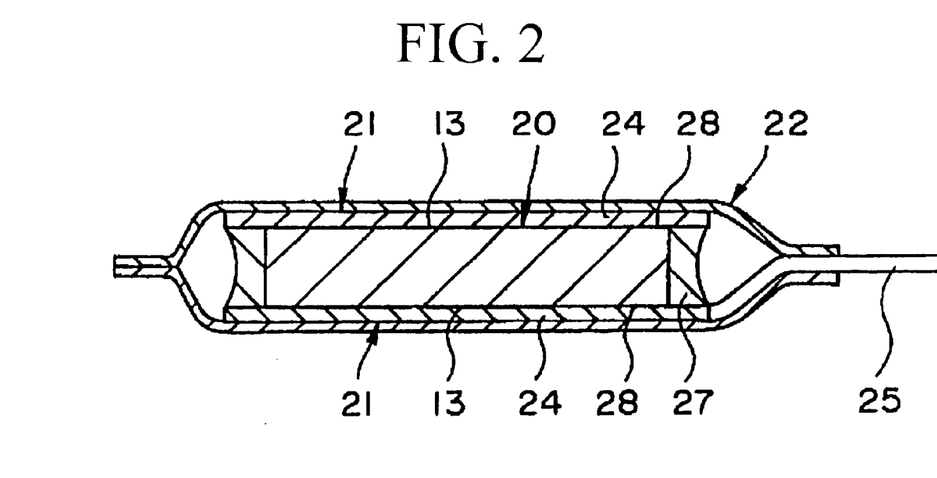
FIG. 2 is a diagram showing a side cross-sectional view of the electric double layer capacitor according to embodiment 1 of the present invention.
Figure 3:
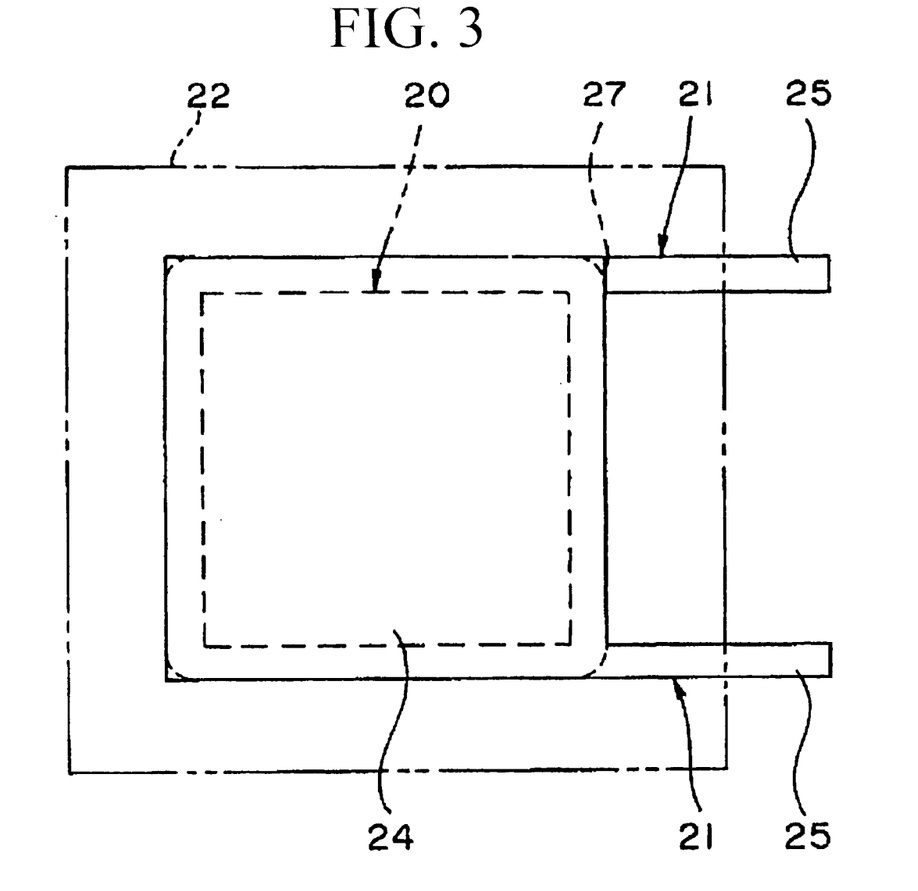
FIG. 3 is a diagram showing a plan view of the electric double layer capacitor according to embodiment 1 of the present invention.

A plurality of basic cells 15, more specifically six layers of basic cells 15 in this embodiment, formed by the steps 1 through 4 mentioned above are sequentially laminated and compressed in the thickness direction of the basic cell 15 to form a multi-layered cell (or laminated cell) 20 shown in FIG. 2. An electrode plate 21 having a lead terminal is attached to the outside of the collectors 13 which are located at both ends of the multi-layered cell 20 in the laminated direction (i.e., the thickness direction of the basic cell 15). Then, the whole is covered by an outer package 22 in a decompression state (i.e., a state in which the pressure is lower than the atmospheric pressure) to produce an electric double layer capacitor.

The electrode plate 21 having a lead terminal may be made by solder-plating the surface of copper, and may include an electrode plate body 24 of a rectangular flat plate shape and a lead terminal 25 of a strip shape which extends from the electrode plate body 24. The electrode plate body 24 is attached to the outside of the collectors 13 located at the outermost side in the laminated direction of the multi-layered cell 20. In this embodiment, the size of the electrode plate body 24 of the electrode plate 21 having a lead terminal is designed to be larger than that of the multi-layered cell 20 so that the electrode plate body 24 may be attached to the multi-layered cell 20 in a state that it extends from the multi-layered cell 20 in all directions perpendicular to the laminated direction of the multi-layered cell 20.

The outer package 22 may be made of a laminated film containing a complex of aluminum and a resin. In this particular embodiment, the outer package 22 is made of a laminated film containing a complex of aluminum and an olefin resin.

In embodiment 1, as mentioned above, the multi-layered cell 20 is disposed between the electrode plates 21 having a lead terminal, and each one of the electrode plates 21 extends in all directions perpendicular to the laminated direction of the multi-layered cell 20. In addition, a sealing material 27 of a rectangular frame shape is disposed in all directions perpendicular to the laminated direction of the multi-layered cell 20 so as to be interposed between the portions of the electrode plates 21 which extend from the laminated cell 20.

The sealing material 27 is used to seal an interface 28 between the collectors 13 located at the outermost side of the multi-layered cell 20 and the respective electrode plate 21 in the outer package 22. A material having a higher gas barrier property than that used for the collector 13 is employed for the sealing material 27. Although an epoxy resin, which is a thermosetting resin, is used for the sealing material 27 in this embodiment, other resins such as a saran resin may also be used as the sealing material 27. Also, although the multi-layered cell 20, the electrode plate 21 having a lead terminal, the outer package 22, and the sealing material 27 are depicted as ones having a certain thickness in the figure for clarifying each part, the thickness thereof is significantly thin in practice (the same is also applied to other embodiments described later).

The multi-layered cell 20, in which the basic cells 15 formed by the above-mentioned steps 1 through 4 are laminated, may be subjected to a packaging process as follows.

That is, as a fifth step, while the electrode plate body 24 is disposed on a predetermined position of the outside surface of each one of the collectors 13, which is made of a conductive film and located at the outermost side in the laminated direction of the multi-layered cell 20, so that the entire periphery portion thereof extend from the multi-layered cell 20, and the sealing material 27 made of an epoxy resin is applied between the portions of the electrode plate body 24 extending from the multi-layered cell 20 so as to surround the multi-layered cell 20 in the direction perpendicular to the laminated direction of the multi-layered cell 20, heat (e.g., about 85° C.) is applied for a predetermined time (e.g., about two hours) so that the sealing material 27 is cured to unite the electrode plates 21 and the multi-layered cell 20.

Finally, as a sixth step, the united sealing material 27, electrode plates 21 having a lead terminal, and multi-layered cell 20 mentioned above is covered by the outer package 22 in a decompression state (i.e., a state in which the pressure is lower than the atmospheric pressure) and the entire outer periphery portion of the outer package 22 is thermally fused to produce an electric double layer capacitor. When the electric double layer capacitor is used under atmospheric pressure, a compression force is always applied to the capacitor from the outside thereof due to the atmospheric pressure.

As shown in Table 1 below, the volume specific resistance of a conductive film used for the collector 13 in the above-mentioned embodiment 1, in which carbon is dispersed in an ethylene-styrene-butylene cross-linked copolymer resin to have conductivity, is $0.002[\Omega \cdot m]$. Since the volume specific resistance of a conventional conductive rubber, in which carbon is dispersed in a butyl rubber, is $0.012[\Omega \cdot m]$, the volume specific resistance of the collector 13 according to the present invention is significantly reduced and, hence, the ESR thereof is also decreased.

TABLE 1

| Base resin of conductive film or conductive rubber | $CO_2$ gas permeability coefficient $[m^3/m^2/\cdot s \cdot Pa]$ | Volume specific resistance $[\Omega \cdot m]$ | Remarks |
| --- | --- | --- | --- |
| Ethylene-styrene-butylene copolymer resin | $6.8 \times 10^{-12}$ | 0.002 | |
| Polypropylene | $2.2 \times 10^{-12}$ | 0.005 | |
| Polyethylene | $4.7 \times 10^{-12}$ | 0.003 | |
| Butyl rubber | $5.3 \times 10^{-14}$ | 0.012 | Prior art |

On the other hand, as shown in Table 1, the gas permeability coefficient (measured in conformity with ASTM D 1434) of the conductive film, in which carbon is dispersed in an ethylene-styrene-butylene cross-linked copolymer resin to have conductivity, is $6.8 \times 10^{-12} [m^3/(m^2 \cdot s \cdot Pa)]$ whereas that of the conductive rubber, in which carbon is dispersed in butyl rubber, is $5.3 \times 10^{-14} [m^3/(m^2 \cdot s \cdot Pa)]$. Accordingly, the gas permeability coefficient of the collector 13 is increased as compared with that of the prior art. However, according to the present invention, as mentioned above, since the sealing material 27 having a gas barrier property higher than the collector 13 is provided so as to seal the interface 28 between each one of the collectors 13, which is located at the outermost side in the laminated direction of the multi-layered cell 20, and the respective electrode plate 21 in the outer package 22, the sealing material 27 prevents the electrolyte 16 from being gasified and leaked out from the interface 28 between the collector 13 and the electrode plate 21 to the inside of the outer package 22.

Accordingly, since a satisfactory decompression state in the outer package 22 may be maintained even if the collectors 13 are made of a material having a high gas permeability coefficient as explained above, an increase in the ESR due to a gas leak may be prevented. Therefore, the ESR of the collectors 13, which is decreased by using the conductive film, may be maintained and the electrical performance of the capacitor may be stabilized even if the capacitor were to be used under a high temperature atmosphere.

Ten electric double layer capacitors prepared in the manner described in embodiment 1 were subjected to a test in which a voltage of 8V was continuously applied for 1,000 hours at 85° C. under atmospheric pressure, and the mean value of the rate of ESR change and the rate of volume change before and after the test were determined. Also, as a comparative embodiment, an electric double layer capacitor having no sealing material 27 was also subjected to the same test. The results are shown in Table 2.

TABLE 2

|  | Rate of ESR change | Rate of volume change |
| --- | --- | --- |
| Embodiment 1 | 180% | −25% |
| Embodiment 2 | 195% | −28% |
| Embodiment 3 | 170% | 22% |
| Embodiment 4 | 150% | −18% |
| Comp. Emb. | 1530% | 45% |

As shown in Table 2, whereas the electric double layer capacitor of the comparative embodiment having no sealing material 27 has the rate of ESR change and the rate of volume change of 1530% and 45%, respectively, those of the electric double layer capacitor prepared in embodiment 1 are 180% and −25%, respectively. Accordingly, it is obvious that the electric double layer capacitor according to embodiment 1 of the present invention is effective for stabilizing the electric performance thereof under the high temperature atmosphere.

Moreover, in the electric double layer capacitor according to embodiment 1, since the periphery portion of the electrode plate body 24 extends from the multi-layered cell 20 and the sealing material 27 is disposed between the extended portion of each one of the electrode plate bodies 24, the sealing material 27 is not placed between the multi-layered cell 20 and the electrode plate 21. Accordingly, it becomes possible to prevent the decrease in the degree of contact between the multi-layered cell 20 and the electrode plate 21 due to the presence of the sealing material 27 therebetween.

Embodiment 2

Next, embodiment 2 according to the present invention will be described with reference to FIGS. 4 and 5 with a focus on elements different from those of embodiment 1. Note that in embodiment 2, the same numerals are used for those portions which are the same as those in embodiment 1 and, therefore, explanation thereof will be omitted.

An electric double layer capacitor according to embodiment 2 of the present invention has substantially the same structure as the one prepared in embodiment 1 and includes the basic cell 15 which is prepare by using the steps 1 through 4 explained in embodiment 1.

Figure 4:
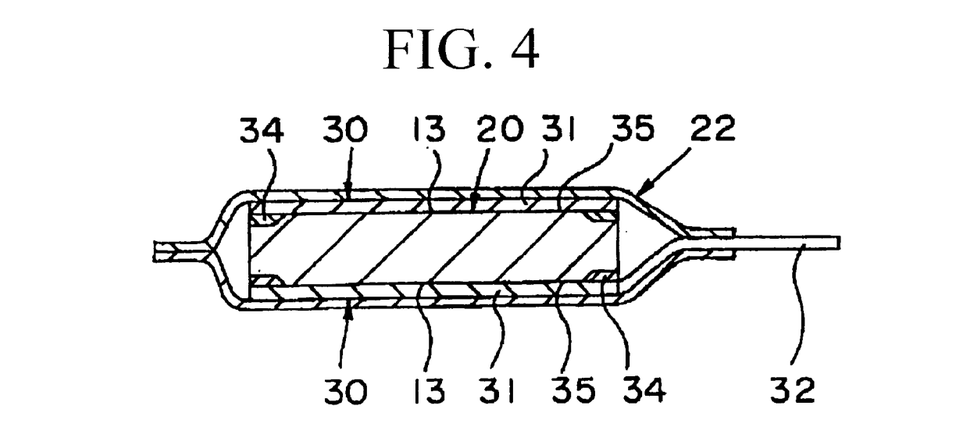
FIG. 4 is a diagram showing a side cross-sectional view of an electric double layer capacitor according to embodiment 2 of the present invention.
Figure 5:
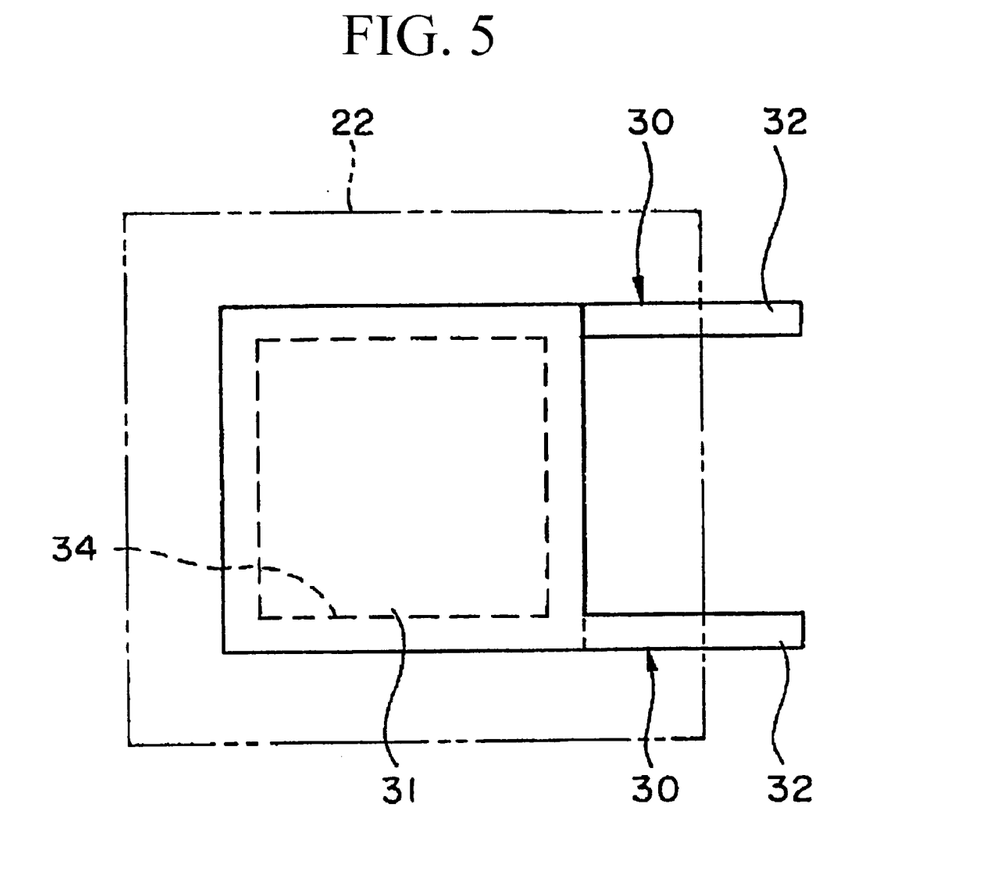
FIG. 5 is a diagram showing a plan view of the electric double layer capacitor according to embodiment 2 of the present invention.

A plurality of the basic cells 15, more specifically six layers of the basic cells 15 are sequentially laminated and compressed in the thickness direction of the basic cell 15 to form a multi-layered cell (or laminated cell) 20 shown in FIG. 4. An electrode plate 30 having a lead terminal is attached to the outside surface of each one of the outermost collectors 13, these outermost collectors 13 being located at ends of the multi-layered cell 20 in the laminated direction (i.e., the thickness direction of the basic cell 15). The whole is covered by an outer package 22 in a decompression state to produce an electric double layer capacitor.

The electrode plate 30 having a lead terminal in embodiment 2 may be made by solder-plating the surface of copper, and includes an electrode plate body 31 of a rectangular flat plate shape and a lead terminal 32 of a strip shape which extends from the electrode plate body 31. The electrode plate body 31 is attached to the outside surface of the respective collector 13 which is located at the outermost side in the laminated direction of the multi-layered cell 20. In this embodiment 2, the size of the electrode plate body 31 of the electrode plate 30 having a lead terminal is designed to be the same as the size of the multi-layered cell 20 so that the electrode plate body 31 may be attached to the multi-layered cell 20 in such a state that it overlaps with the multi-layered cell 20 in all directions perpendicular to the laminated direction of the multi-layered cell 20.

In embodiment 2, a sealing material 34 is disposed, so as to be in a frame shape, between the entire outer periphery portion of the collector 13, which is located at the outermost side in the laminated direction of the multi-layered cell 20, and the entire outer periphery portion of the electrode plate 21, which is overlapped with the outer periphery portion of the collectors 13, in the direction perpendicular to the laminated direction of the multi-layered cell 20. As in embodiment 1, the sealing materials 34 are used to seal an interface 35 between each one of the outermost collectors 13, the collectors 13 being located at the outermost side of the multi-layered cell 20, and the respective electrode plate 30 in the outer package 22. Also, a material having a higher gas barrier property than the collectors 13, i.e., an epoxy resin which is a thermosetting resin in this embodiment, is used for the sealing material 34. Moreover, as in embodiment 1, a saran resin may be used instead of the epoxy resin.

The multi-layered cell 20, which is constructed by laminating the basic cell 15 made by the steps 1 through 4 described in embodiment 1, is subjected to a packaging process as follows.

That is, as a fifth step, after the epoxy resin, which is used as the sealing material 34 in this embodiment, is applied, so as to be in a frame shape, to the respective entire outer periphery portion of each one of the outermost collectors 13, the collectors 13 being made of a conductive film and located at the outermost side of the multi-layered cell 20 in the laminated direction, the electrode plate body 31 of the electrode plate 30 is attached to the respective outside surface of the collector 13 so that the direction thereof perpendicular to the laminated direction of the multi-layered cell 20 may be matched with that of the multi-layered cell 20. Then, heat (e.g., 85° C.) is applied for a predetermined time (e.g., two hours) so that the sealing material 34 is cured to unite the electrode plates 30 having a lead terminal and the multi-layered cell 20.

Finally, as a sixth step, the united sealing materials 34, electrode plates 30 having a lead terminal, and multi-layered cell 20 mentioned above are covered by the outer package 22 in a decompression state as in embodiment 1 and the entire outer periphery portion of the outer package 22 is thermally fused to produce an electric double layer capacitor.

According to embodiment 2 of the present invention mentioned above, since the sealing material 34 having a gas barrier property higher than the collector 13 is provided so as to seal the interface 35 between each one of the collectors 13, which is located at the outermost side of the multi-layered cell 20, and the electrode plate 30 having a lead terminal in the outer package 22, the sealing material 34 prevents the electrolyte 16 from being gasified and leaked out from the interface 35 between the collector 13 and the electrode plate 30 to the inside of the outer package 22.

Accordingly, as in embodiment 1, since a satisfactory decompression state in the outer package 22 may be maintained even if the collectors 13 are made of a material having a high gas permeability coefficient, an increase in the ESR due to gas leak may be prevented and the electrical performance of the capacitor may be stabilized even if the capacitor is used under a high temperature atmosphere.

Ten electric double layer capacitors prepared in the manner described in embodiment 2 were subjected to a test in which a voltage of 8V was continuously applied for 1,000 hours at 85° C. under atmospheric pressure, and the mean value of the rate of ESR change and the rate of volume change before and after the test were determined. The results are shown in Table 2.

As shown in Table 2, whereas the electric double layer capacitor of the comparative embodiment having no sealing material 34 has the rate of ESR change and the rate of volume change of 1530% and 45%, respectively, those of the electric double layer capacitor in embodiment 2 are 195% and −28%, respectively. Accordingly, it is obvious that the electric double layer capacitor according to embodiment 2 of the present invention is effective for stabilizing the electric performance thereof under the high temperature atmosphere.

Moreover, in the electric double layer capacitor according to embodiment 2, since the sealing material 34 is disposed between the outer periphery end portion of each the collectors 13, which is located at the outermost side of the multi-layered cell 20, and the electrode plate 30 having a lead terminal, the shape of the electrode plate 30 may be designed to be the same as that of the collector 13 and, hence, the size and weight of the electric double layer capacitor may be reduced.

Embodiment 3

Next, embodiment 3 according to the present invention will be described with a focus on elements different from those of embodiments 1 and 2. Note that in embodiment 3, the same numerals are used for those portions which are the same as those in embodiments 1 and 2 and, therefore, explanation thereof will be omitted.

An electric double layer capacitor according to embodiment 3 of the present invention is prepared by the same method and has the same structure as the one prepared in embodiment 2 except that the sealing material 34 made of an epoxy resin was changed to that made of an acrylic resin.

An electric double layer capacitor according to embodiment 3 of the present invention is also capable of exerting the same effect as the one prepared in embodiment 2.

Ten electric double layer capacitors according to embodiment 3 were subjected to the same test as in embodiments 1 and 2 in which a voltage of 8V was continuously applied for 1,000 hours at 85° C. under atmospheric pressure, and the mean values before and after the test of both the rate of ESR change and the rate of volume change were determined. The results are shown in Table 2.

As shown in Table 2, whereas the electric double layer capacitor of the comparative embodiment having no sealing material 34 has the rate of ESR change and the rate of volume change of 1530% and 45%, respectively, those of the electric double layer capacitor in embodiment 3 are 170% and 22%, respectively. Accordingly, it is indicated that the electric double layer capacitor according to embodiment 3 of the present invention is effective for stabilizing the electric performance thereof under a high temperature atmosphere.

Embodiment 4

Next, embodiment 4 according to the present invention will be described with a focus on elements different from embodiment 1. Note that in embodiment 4, the same numerals are used for those portions which are the same as those in embodiment 1 and, therefore, explanation thereof will be omitted.

An electric double layer capacitor according to embodiment 4 of the present invention is prepared by the same method and has the same structure as the one prepared in embodiment 1 except that the a conductive film, in which carbon is dispersed in polypropylene to have conductivity, is used for the collector 13 instead of the conductive film used in embodiment 1, in which carbon is dispersed in ethylene-styrene-butylene cross-linked copolymer resin to have conductivity.

As shown in Table 1 above, the volume specific resistance of a conductive film used for the collector 13 in the above-mentioned embodiment 4, in which carbon is dispersed in polypropylene to have conductivity, is $0.005[\Omega \cdot m]$. Since the volume specific resistance of a conventional conductive rubber, in which carbon is dispersed in a butyl rubber, is $0.012[\Omega \cdot m]$, the volume specific resistance of the collector 13 according to the present invention is significantly reduced. On the other hand, as shown in Table 1, the gas permeability coefficient of the conductive film, in which carbon is dispersed in polypropylene to have conductivity, is $2.2 \times 10^{-12}[m^3/(m^2 \cdot s \cdot Pa)]$ whereas that of the conventional conductive rubber, in which carbon is dispersed in butyl rubber, is $5.3 \times 10^{-14}[m^3/(m^2 \cdot s \cdot Pa)]$. Accordingly, the gas permeability coefficient of the collector 13 is increased as compared with that of the prior art. However, according to this embodiment of the present invention, as mentioned above, the same effect as embodiment 1 may also be exerted by embodiment 4 by eliminating the disadvantage due to the increase in the gas permeability coefficient.

Ten electric double layer capacitors according to embodiment 4 were subjected to the same test as in embodiments 1 and 2 in which a voltage of 8V was continuously applied for 1,000 hours at 85° C. under atmospheric pressure, and the mean value of the rate of ESR change and the rate of volume change before and after the test were determined. The results are shown in Table 2.

As it is shown in Table 2, whereas the electric double layer capacitor of the comparative embodiment having no sealing material 27 has the rate of ESR change and the rate of volume change of 1530% and 45%, respectively, those of the electric double layer capacitor in embodiment 4 are 150% and −18%, respectively. Accordingly, it is indicated that the electric double layer capacitor according to embodiment 4 of the present invention is effective for stabilizing the electric performance thereof under a high temperature atmosphere.

Figure 6:
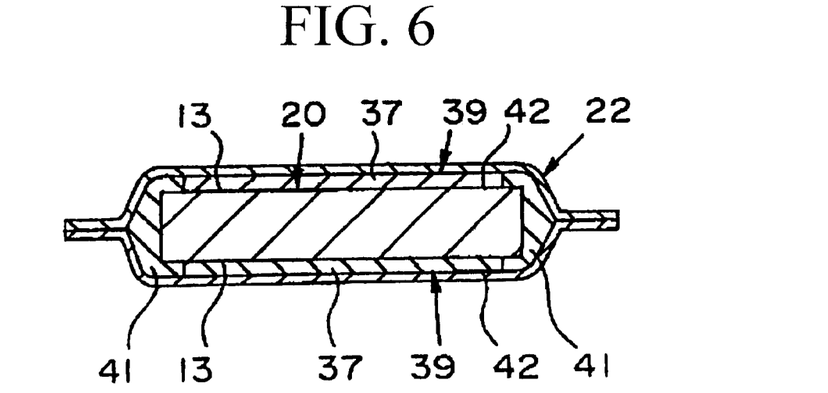
FIG. 6 is a diagram showing a side cross-sectional view of an electric double layer capacitor according to a modified embodiment of the present invention.

Note that a modification such as one shown in FIG. 6 may be made to an electric double layer capacitor according to the other embodiments of the present invention.

That is, as shown in the figure, an electrode plate 39 including an electrode plate body 37 of a rectangular shape and a lead terminal (not shown in FIG. 6) of a strip shape extending from the electrode plate body 37 is placed on each one of the outermost collectors 13, which is located at the outermost side in the laminated direction, so as to be within the outer periphery portion of the collector 13 in all directions perpendicular to the laminated direction of the multi-layered cell 20. Then, a sealing material 41 is applied to the periphery portions of the collector 13, which is not covered by the electrode plate body 37. That is, the sealing material 41 is applied so as to surround the electrode plate body 37 of the electrode plate 39 having a lead terminal. As in embodiment 1, the sealing material 41 is also used to seal an interface 42 between the outermost collectors 13, which are located at the outermost side in the laminated direction of the multi-layered cell 20, and the electrode plate 39 having a lead terminal within the outer package 22. A material having a higher gas barrier property than the collector 13 is used for the sealing material 41.

According to this embodiment, since the sealing material 41 is not present between the laminated cell 20 and the electrode plate 39 having a lead terminal as in embodiment 1, a decrease in the degree of contact between the multi-layered cell 20 and the electrode plate 39 due to the presence of the sealing material 41 may be prevented.

Also, as a conductive film, one in which carbon is dispersed in polyethylene to have conductivity and has a gas permeability coefficient of $4.7 \times 10^{-12} [m^3/(m^2 \cdot s \cdot Pa)]$ and a volume specific resistance of $0.003 [\Omega \cdot m]$ as shown in Table 1 may be used instead of the conductive film used in embodiments 1–3, in which carbon is dispersed in ethylene-styrene-butylene cross-linked copolymer resin to have conductivity, and the conductive film used in embodiment 4, in which carbon is dispersed in polypropylene to have conductivity used in embodiment 4.

If the gas permeability coefficient of a collector is $1 \times 10^{-12} [m^3/(m^2 \cdot s \cdot Pa)]$ or greater, the amount of electrolyte becomes too large to be ignored which is gasified and leaking out from an interface between the outermost collector, which is located at the outermost side in the laminated direction, and an electrode plate to the inside of the outer package. Accordingly, the effect of preventing a gas leak due to the presence of the above-mentioned sealing material becomes significant.

Note that although the multi-layered cell 20, in which a plurality of the basic cell 15 is laminated, is used as an example in the above-explained embodiments, a single-layer cell which is constituted by a single basic cell 15 may be used instead of the multi-layered cell 20.

Also, although the explanation has been made for the electric double layer capacitor in the above-mentioned embodiments, the configuration mentioned above may also be applied to a battery (i.e., a proton battery), which is constructed by simply applying an active material disclosed in the Japanese Patent No. 3036501 instead of the activated carbon used for the polarized electrode 12. In that case, the electrical performance of the battery may also be stabilized even if the battery is used under a high temperature atmosphere.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. The foregoing discussion is intended to be illustrative only; the invention is limited and defined only by the following claims and equivalents thereto.

What is claimed is:

1. An electric double layer capacitor, comprising:
   at least one basic cell containing an electrolyte inside thereof, said basic cell may be laminated in its thickness direction to form a layered cell, including:
   a separator;
   a pair of polarized electrodes disposed so as to sandwich and make contact with said separator;
   a pair of collectors disposed so as to sandwich said polarized electrodes, each one of said pair of collectors making contact with the surface of one of said pair of polarized electrodes which opposes the surface making contact with said separator; and
   a gasket disposed between said pair of collectors so as to surround said pair of polarized electrodes;
   an electrode plate including an electrode body and a lead terminal extending from said electrode plate body, said electrode plate body being attached to the outer surface of each one of said collectors located at the outermost side in a laminated direction of said basic cell;
   an outer package which covers said basic cell and said electrode plate in a decompression state; and
   a sealing material having a higher gas barrier property than said collectors, said sealing material being disposed so as to seal an interface between each one of said collectors, which are located at the outermost side in a laminated direction of said basic cell, and said electrode plate body in said outer package.

2. An electric double layer capacitor according to claim 1, wherein
   the gas permeability coefficient of each one of said collectors is at least $1 \times 10^{-12} [m^3/(m^2 \cdot s \cdot Pa)]$.

3. An electric double layer capacitor according to claim 1, wherein
   said electrode plate body extends in a circumferential direction thereof, and
   said sealing material is disposed between said extended portion of each one of said electrode bodies so as to surround said basic cell.

4. An electric double layer capacitor according to claim 2, wherein
   said electrode plate body extends in a circumferential direction thereof, and
   said sealing material is disposed between said extended portion of each one of said electrode bodies so as to surround said basic cell.

5. An electric double layer capacitor according to claim 1, wherein
   said sealing material is disposed between an outer periphery portion of each one of said collectors, which are located at the outermost side in a laminated direction of said basic cell, and said electrode plate body.

6. An electric double layer capacitor according to claim 2, wherein
   said sealing material is disposed between an outer periphery portion of each one of said collectors, which are located at the outermost side in a laminated direction of said basic cell, and said electrode plate body.

7. An electric double layer capacitor according to claim 1, wherein
   said electrode plate body is disposed on each one of said collectors, which are located at the outermost side in a laminated direction of said basic cell, so as to be located more inwardly with respect to the outer periphery portion of each one of said collectors, and
   said sealing material is disposed so as to surround said electrode plate body and cover portions of each one of said collectors not covered by said electrode plate body.

8. An electric double layer capacitor according to claim 2, wherein
   said electrode plate body is disposed on each one of said collectors, which are located at the outermost side in a laminated direction of said basic cell, so as to be located more inwardly with respect to the outer periphery portion of each one of said collectors, and
   said sealing material is disposed so as to surround said electrode plate body and cover portions of each one of said collectors not covered by said electrode plate body.

* * * * *